US011290290B2

(12) United States Patent
Castle et al.

(10) Patent No.: US 11,290,290 B2
(45) Date of Patent: Mar. 29, 2022

(54) PHYSICAL UNCLONABLE FUNCTION VARIABLE READ SENSOR

(71) Applicant: LEXMARK INTERNATIONAL, INC., Lexington, KY (US)

(72) Inventors: Scott Richard Castle, Lexington, KY (US); Gary Allen Denton, Lexington, KY (US); Robert Henry Muyskens, Lexington, KY (US); Samuel Leo Rhodus, Lexington, KY (US); Brant Dennis Nystrom, Lexington, KY (US)

(73) Assignee: LEXMARK INTERNATIONAL, INC., Lexington, KY (US)

( * ) Notice: Subject to any disclaimer, the term of this patent is extended or adjusted under 35 U.S.C. 154(b) by 0 days.

(21) Appl. No.: 16/822,355

(22) Filed: Mar. 18, 2020

(65) Prior Publication Data

US 2020/0304323 A1 Sep. 24, 2020

Related U.S. Application Data

(60) Provisional application No. 62/822,495, filed on Mar. 22, 2019.

(51) Int. Cl.
*H04L 29/06* (2006.01)
*H04L 9/32* (2006.01)
*B41J 2/175* (2006.01)
*G01R 33/20* (2006.01)
*H01F 1/055* (2006.01)
*H04L 9/08* (2006.01)

(52) U.S. Cl.
CPC ........ *H04L 9/3278* (2013.01); *B41J 2/17503* (2013.01); *G01R 33/20* (2013.01); *H01F 1/055* (2013.01); *H04L 9/0861* (2013.01)

(58) Field of Classification Search
None
See application file for complete search history.

(56) References Cited

U.S. PATENT DOCUMENTS

| 4,866,382 A | 9/1989 | Carmen |
| 5,181,074 A | 1/1993 | Nemoto et al. |
| 5,491,633 A | 2/1996 | Henry |
| 6,259,219 B1 | 7/2001 | Strauch |

(Continued)

FOREIGN PATENT DOCUMENTS

| DE | 102008043265 A1 | 6/2010 |
| WO | 2018115068 A1 | 6/2018 |

OTHER PUBLICATIONS

International Search Report; PCT application # PCT/US2020/23308, dated Aug. 6, 2020.

(Continued)

*Primary Examiner* — Maung T Lwin

(57) ABSTRACT

Magnetic PUFs (Physical Unclonable Function) may utilizes a single 3-axis Hall-effect sensor for enrollment. When a PUF is manufactured, a Hall-effect sensor is used to model the PUF disk and store that data where it may be accessed. This process is called "enrollment." This invention improves upon the PUF implementation by introducing controlled variability into the enrollment, the reading of the PUF data from the Hall-effect sensors (the number and position of read sensors), the sampling method of the read sensor(s), and the processing of the PUF data.

6 Claims, 2 Drawing Sheets

(56) References Cited

U.S. PATENT DOCUMENTS

| | | | |
|---|---|---|---|
| 8,850,608 B2* | 9/2014 | Tehranipoor | H03K 3/0315 |
| | | | 726/34 |
| 9,122,252 B2 | 9/2015 | Kimura | |
| 9,361,562 B1 | 6/2016 | Hanina | |
| 9,553,582 B1 | 1/2017 | Booth et al. | |
| 9,589,399 B2* | 3/2017 | Taveau | G07C 9/257 |
| 2009/0128135 A1 | 5/2009 | Masham | |
| 2014/0304167 A1 | 10/2014 | Atkinson | |
| 2015/0193632 A1 | 7/2015 | Golac | |
| 2017/0102668 A1* | 4/2017 | Cannon | H04L 9/3278 |
| 2017/0103791 A1* | 4/2017 | Booth | G11B 5/00 |
| 2017/0103834 A1 | 4/2017 | Booth | |
| 2017/0103843 A1* | 4/2017 | Nakanoue | H01F 27/245 |
| 2017/0104600 A1* | 4/2017 | Booth | H04L 9/3278 |
| 2018/0006830 A1* | 1/2018 | Cambou | G06F 11/2268 |
| 2018/0009110 A1 | 1/2018 | Langford | |

OTHER PUBLICATIONS

U.S. Patent and Trademark Office; Non-final Office Action, U.S. Appl. No. 16/822,347 dated Jun. 10, 2021.

* cited by examiner

PHYSICAL UNCLONABLE FUNCTION VARIABLE READ SENSOR

CROSS REFERENCES TO RELATED APPLICATIONS

U.S. patent application Ser. No. 16/822,347, titled "Physical Unclonable Function Encoder," and U.S. patent application Ser. No. 16/822,365, titled "Physical Unclonable Function Region Encoding."

PRIORITY CLAIM FROM PROVISIONAL APPLICATION

The present application is related to and claims priority under 35 U.S.C. 119(e) from U.S. provisional application No. 62/822,495, filed Mar. 22, 2019, titled "Physical Unclonable Function Encoder," the content of which is hereby incorporated by reference herein in its entirety.

BACKGROUND

The present disclosure relates generally adding controlled variability to a physical unclonable function system enrollment and measurement.

SUMMARY

Magnetic PUFs (Physical Unclonable Function) may utilizes a single 3-axis Hall-effect sensor for enrollment. When a PUF is manufactured, a Hall-effect sensor is used to model the PUF disk and store that data where it may be accessed. This process is called "enrollment." This invention improves upon the PUF implementation by introducing controlled variability into the enrollment, the reading of the PUF data from the Hall-effect sensor, and the processing of the PUF data. The concept presented is to add controlled variability to the PUF system to increase both the confidence in validating an authentic component and reduce the risk for an attacker to clone the component. Example ways to add this variability include: the number and position of read sensors; the sampling method of the read sensor(s); and the data.

BRIEF DESCRIPTION OF THE DRAWINGS

The above-mentioned and other features and advantages of the disclosed embodiments, and the manner of attaining them, will become more apparent and will be better understood by reference to the following description of the disclosed embodiments in conjunction with the accompanying drawings.

DETAILED DESCRIPTION

Figure 1:
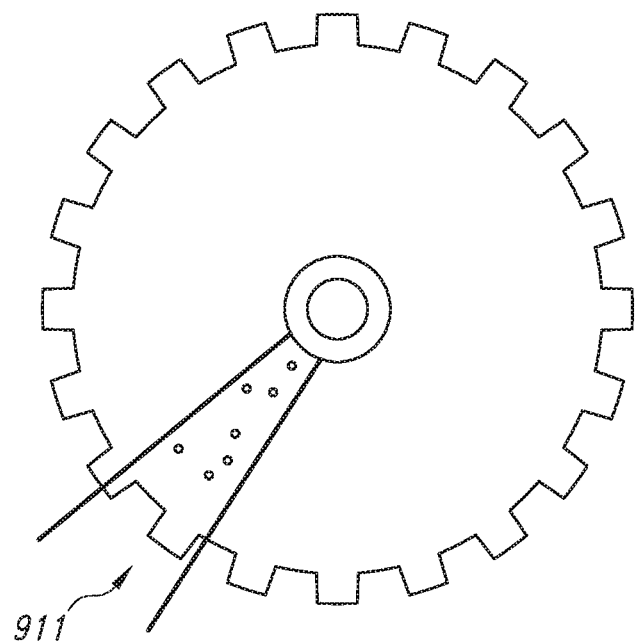
FIG. 1 shows a PUF gear with a logical read band traversing from the center hub to the gear edge.

It is to be understood that the present disclosure is not limited in its application to the details of construction and the arrangement of components set forth in the following description or illustrated in the drawings. The present disclosure is capable of other embodiments and of being practiced or of being carried out in various ways. Also, it is to be understood that the phraseology and terminology used herein is for the purpose of description and should not be regarded as limiting. As used herein, the terms "having," "containing," "including," "comprising," and the like are open ended terms that indicate the presence of stated elements or features, but do not preclude additional elements or features. The articles "a," "an," and "the" are intended to include the plural as well as the singular, unless the context clearly indicates otherwise. The use of "including," "comprising," or "having," and variations thereof herein is meant to encompass the items listed thereafter and equivalents thereof as well as additional items.

Terms such as "about" and the like have a contextual meaning, are used to describe various characteristics of an object, and such terms have their ordinary and customary meaning to persons of ordinary skill in the pertinent art. Terms such as "about" and the like, in a first context mean "approximately" to an extent as understood by persons of ordinary skill in the pertinent art; and, in a second context, are used to describe various characteristics of an object, and in such second context mean "within a small percentage of" as understood by persons of ordinary skill in the pertinent art.

Unless limited otherwise, the terms "connected," "coupled," and "mounted," and variations thereof herein are used broadly and encompass direct and indirect connections, couplings, and mountings. In addition, the terms "connected" and "coupled" and variations thereof are not restricted to physical or mechanical connections or couplings. Spatially relative terms such as "top," "bottom," "front," "back," "rear," and "side," "under," "below," "lower," "over," "upper," and the like, are used for ease of description to explain the positioning of one element relative to a second element. These terms are intended to encompass different orientations of the device in addition to different orientations than those depicted in the figures. Further, terms such as "first," "second," and the like, are also used to describe various elements, regions, sections, etc., and are also not intended to be limiting. Like terms refer to like elements throughout the description.

One use of PUF disks and sensors is for printer toner cartridge security chip authentication as set forth in U.S. Pat. No. 9,553,582, titled "Physical Unclonable Functions Having Magnetic and Non-Magnetic Particles," the content of which is hereby incorporated by reference herein in its entirety. PUFs (Physical Unclonable Function) utilizes a single 3-axis Hall-effect sensor for enrollment. When the toner cartridge is manufactured, a Hall-effect sensor is used to model the cartridge's PUF disk and store that data in the non-volatile random-access memory ("NVRAM") of the cartridge or in the cloud where the data may be accessed. This process is called "enrollment." When a PUF enabled toner cartridge is placed inside the printer, the Hall-effect sensor is seated at a fixed position and distance from the PUF disk. This invention improves upon the PUF implementation by introducing controlled variability into the enrollment, printer read of the PUF data from the Hall-effect sensor, and processing of the PUF data.

The concept presented is to add controlled variability to the PUF system to increase both the confidence in validating an authentic supply component and reduce the risk for an attacker to clone the supply. Ways to add this variability include: the number and position of read sensors; the sampling method of the read sensor(s); and the data.

The first discussion is on the number and placement of sensors. There can either be a single read sensor that can be varied in its position in three-dimensions, or there can be an array of "N" number of sensors arranged in a pattern (linear, diagonal, X, etc.).

This position variability can be achieved in many ways. The first is to vary the position of the sensors, both the enrollment sensor and the read sensor within the printer for PUF validation. The sensor variability will be achieved by placing the sensor in a component whose spatial position can be varied in all 3 axes (with a set of motors for example).

At PUF enrollment (initial cartridge manufacture) the PUF read sensor can be: (1) set to a single static position; (2) set to an initial position and then change the sensor position throughout the PUF read sample cycle; or (3) set to a static position to read around the entire circumference, then repositioned to another position to read another "band," up to "N" bands.

The placement of the sensor and the method of placement (static or variable) can be configurable and controlled by a software program, a user, or randomized. The sensor position data and method of data capture will be stored and encoded into the cartridge NVRAM along with the PUF sensor read data. The number of samples needed will be based on PUF disk size and spatial location of the PUF sensor relative to the PUF disk. This number of samples is based on a ratio of samples relative to the radial distance. This radial distance changes based on the sensor "X" position relative to the PUF disc center.

In addition to the sensor location data being stored in the cartridge's NVRAM, the number of samples will also be stored. In the case of a randomized single sensor, the number of samples will be calculated based on the number of samples using the inner most read position on the PUF disk.

In the case of enrolling or reading a band or multiple bands, the number of samples per band will be calculated and stored in the NVRAM. It is understood that adding this variability may add cost to the print device, but it helps expand the thinking on how a specific set of data is captured (additional protection) but it also extends the invention to other spaces where there may be a need for PUF authentication where a moving sensor is already present or where the PUF device is stationary and the sensor must move (a linear or bar PUF device for example).

The second way to vary the position of the sensors is to utilize an array of "N" Hall-effect sensors arranged in a specific pattern. By enabling or reading specific sensors the spatial position of the sensors is effectively changed. The sensor array may still be varied on the axis perpendicular to the disk to either; ensure consistent distance from the PUF wheel or to add additional security in the form of a random distance from the PUF wheel.

When the cartridge is installed into the printer, the PUF information (including the sensor position method and position information), will be read by the printer. The printer validation sensor position and data capture method (static or variable) is also read from the cartridge NVRAM. This variable position is an improvement over the existing PUF implementation in several ways: giving the PUF read sensors (enrollment and validation) the ability to be adjustable allows for more consistent positioning in the event of component (spring for example) fatigue, component wear, PUF disk wobble, etc.; uncontrolled PUF sensor positions that may vary from enrollment to validation can cause false negative reads and potentially render a false negative cartridge validation; giving the PUF read sensors (enrollment and validation) the ability to be adjustable increases the security of the PUF data as the PUF read data has the added variability of the read sensor position (single variable position or array with variable reads/averages) relative to the PUF disc—changing the read sensor position changes the observed PUF read data; and adding additional sensors increases the probability of detecting an authentic supply and decreases the risk that an attacker can replicate the PUF system to clone the supply.

Figure 3:
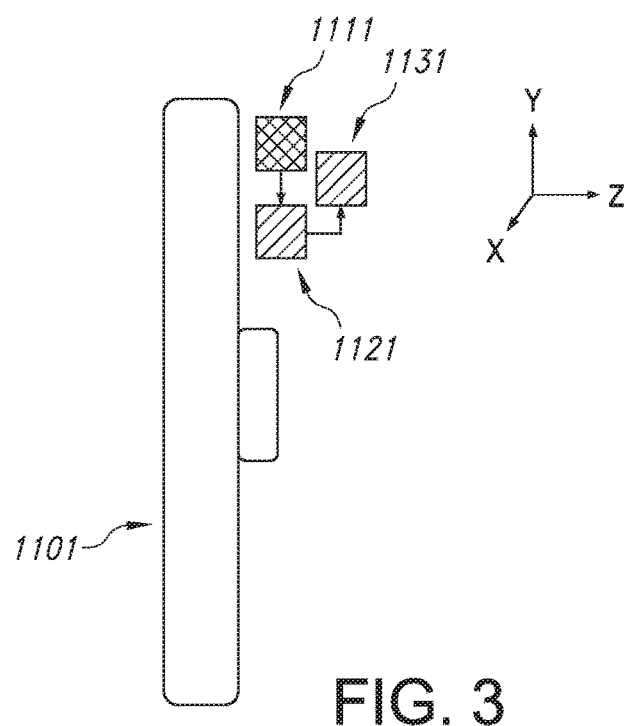
FIG. 3 shows a side view of a PUF gear and three positions of a single read sensor.

The second variability comes in the form of how the sensor data is read, collected and correlated. In the case of the single read sensor, the sensor can be placed in a fixed position for all sample reads or can be moved for any number of the sample reads. FIG. 3 shows a side view of the PUF gear 1101 and three positions 1111, 1121, 1131 of a single read sensor. It could also be the case that the sensor is turned off or the data at any number of sample positions can be zero. This helps alleviate any attempt at modeling the PUF disc independently and falsifying PUF read data. The zero pattern for the samples can be stored in the cartridge NVRAM.

The current PUF implementation uses a single sensor that reads the disc in a static positions. This can be improved to allow or read the entire disc in different positions, similar t tracks on a vinyl record, and store each track as unique data. This allows for the validation process to use any number of multiple data tracks to be used for validation. This process can also increase confidence and help account for read error conditions (inconsistent disc rotation, variations in read sensor gap, etc.) by being read and correlated to give a cartridge confidence measurement (99%, 10%, etc.). The independent strings could also be used to reduce false negative reads. If one track doesn't correlate well (less than 80% match for example) the validation sensor could be repositioned and a new "track" read to attain a higher match confidence.

Figures 4A, 4B, 4C:
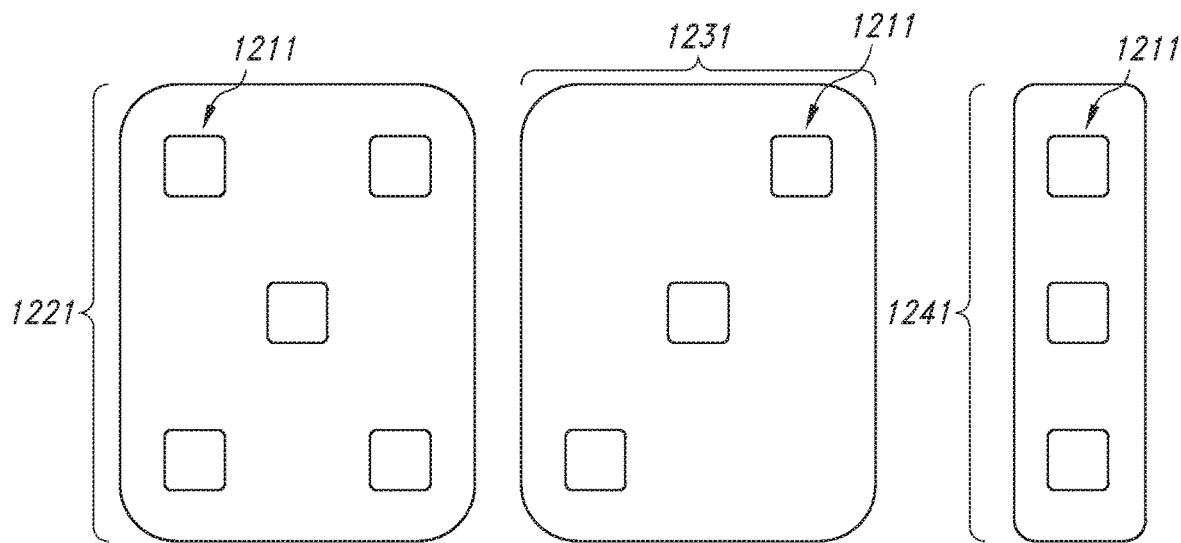
FIGS. 4A, 4B, and 4C show various arrays of sensor positions.

If there is an array of sensors as shown in FIGS. 4A, 4B, and 4C, the individual sensors 1211 in various arrays 1221, 1231, 124 can be on or off for any number of samples and the data used can be randomly picked from the sensor array, or only one random sensor can be turned on for a specific sample, or several sensors can be turned on and multiple "tracks" can be simultaneously read or a mathematical average of sensor data can be used for that specific sample read. FIGS. 4A, 4B, and 4C show examples of components with multiple read sensors arranged in various patterns. A person of ordinary skill in the art would recognize that other patterns could be used.

Another method for increasing the data authenticity is to use an algorithm to determine which samples in the enrollment data will be used. The current PUF implementation uses 60 samples (out of about 1800) at 10° separation (6°, 12°, etc.). An algorithm could be employed to determine which samples are used by an equation, such as:

$$N*6+/-X*0.2,$$

where n is the sample number and X is a constant stored in the cartridge NVRAM.

For example, if X=5 and the addition and subtraction of the variable shift term is alternated, the result would be: (1)*6+(5)*0.2=7° (first sample); (2)*6-(5)*0.2=11° (second sample); (3)*6+(5)*0.2=17° (third sample); etc.

This approach establishes an inconsistent spacing between used samples in the array of sample data. Use of the "X" constant can be made unique and dependent on factors such as; Region for the device/supply, specific customer, customer location, etc.

Yet another option is to use a constant pattern shown in FIG. 1 that is known to the enrollment process and printer firmware. FIG. 1 shows a PUF gear with a logical "read band" traversing from the center hub to the gear edge. The pattern to use 911 would be stored in the cartridge NVRAM and read at validation. For example: 6°, 10°, 15°, 22°, etc., could be pattern No. 1; while 4°, 8°, 12°, 15°, 17°, 23°, 35°, etc., could be pattern No. 2.

Figure 2:
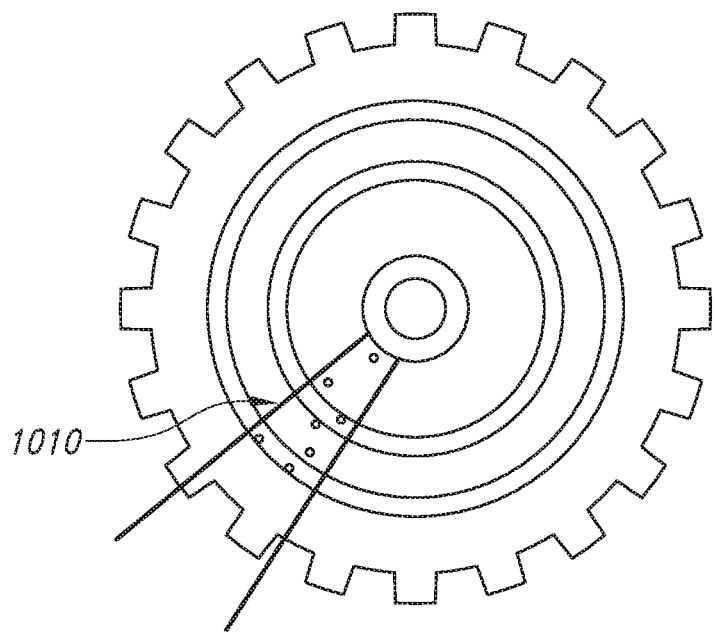
FIG. 2 shows a PUF gear with logical read band traversing from the center hub to the gear edge and logical read tracks within the gear.

Another option shown in FIG. 2 is to read a specific band 1010 on the PUF disc and average the number of reads on a specific axis (or combination of any of the axes) and use that number as the constant. FIG. 2 shows a PUF gear with logical "read band" traversing from the center hub to the gear edge and logical "read tracks" within the gear. This has the advantage of not needing to store a predetermined number in NVRAM. The read position or constant can be a factor of the region of the printer, customer, location, etc.

Adding the ability to vary the method by which sensor data is correlated is an improvement over the existing PUF implementation in several ways: variable read methods aid in the prevention of replication of a single PUF disc with a known fixed sensor spatial position; and variable read methods increases the security of the PUF data by creating an unpredictable read pattern and unknown sensor spatial positions.

The method of the reading, collecting and correlating the sensor data can be configurable by a software program, a user or randomized.

These improvements not only apply specifically to printers and supplies, but also have application in any industry that wants to authenticate using magnetic PUF solutions, e.g., credit cards, integrated circuit chips, etc. Another variable aspect is the application of these improvements to PUF devices of a non-circular nature.

The foregoing description of embodiments has been presented for purposes of illustration. It is not intended to be exhaustive or to limit the present disclosure to the precise steps and/or forms disclosed, and obviously many modifications and variations are possible in light of the above teaching. It is intended that the scope of the invention be defined by the claims appended hereto.

We claim:

1. A system for enrolling and reading the magnetic signature of a physical unclonable function consisting of:
   a magnetic physical unclonable function object;
   an array of three or more sensors for enrolling and reading the magnetic signature; and
   a programmable control that varies a position of the array of sensors throughout a physical unclonable function read cycle starting at an initial position and then changing the position of the array of sensors throughout the read cycle, whereby varying the position of the array of sensors and enabling specific sensors increases confidence in validating the magnetic physical unclonable function object and reduces risk of cloning by an attacker.

2. The system of claim 1, wherein the array of sensors is arranged in a linear, diagonal, or crossed pattern.

3. The system of claim 1, wherein the array of sensors position variability is achieved by placing the the array of sensors in a component whose spatial position can be varied in all 3 axes with a set of motors.

4. The system of claim 1, wherein the the array of sensors position data and method of data capture is stored and encoded in a non-volatile random access memory along with the physical unclonable function sensor array of sensors read data.

5. The system of claim 1, wherein the system is on a printer.

6. The system of claim 1 wherein a programmable control sets the array of sensors to a static position to read around the entire circumference of the physical unclonable function object, then repositions the array of sensors to another position to read at least one more band across or around the physical unclonable function object.

* * * * *